July 30, 1935.  K. E. KYLÉN  2,009,971

BUILT-UP CRANK SHAFT

Filed July 14, 1934  2 Sheets-Sheet 1

INVENTOR
KARL ERIK KYLÉN
BY
ATTORNEY

July 30, 1935.　　　　K. E. KYLÉN　　　　2,009,971
BUILT-UP CRANK SHAFT
Filed July 14, 1934　　　2 Sheets-Sheet 2

INVENTOR
KARL ERIK KYLÉN
BY Chas. Lyon Russell
His ATTORNEY

Patented July 30, 1935

2,009,971

UNITED STATES PATENT OFFICE 2,009,971

BUILT-UP CRANK SHAFT

Karl Erik Kylén, Gottenborg, Sweden, assignor to Aktiebolaget Svenska Kullagerfabriken, Gottenborg, Sweden, a corporation of Sweden Application July 14, 1934, Serial No. 735,184
In Sweden December 6, 1933

9 Claims. (Cl. 74—598)

This invention relates to improvements for ties for bonding together the parts of built-up structures especially crank shafts, of the kind in which one member is formed hollow at the bond and is expanded into another member by means of a plug or the like, inserted in the hole or cavity in the first mentioned member.

An object of the invention is that the members forming the bond, for instance the web, the crank shaft pin and the plug, are so formed or located in relation one to the other that a zone is formed at the outer end of the bond at which the pin is free of one or both of the other members forming the bond.

Another object of the invention is to so form and locate the parts that the pin and the plug are in engagement for a distance less than the thickness of the web, there being clearance between these parts at the outer end of the bond or the plug ending short of such outer end.

In my United States Patent 1,990,456 granted Feb. 5, 1935, I described a bond arrangement between shafts and pins, for instance in built-up crank shafts or the like, by which the shaft is made hollow at the bond and caused to expand in another member by means of a plug or the like, inserted in the cavity of said shaft and having a substantially cylindrical surface at the bond.

When assembling such crank shafts, however, it has been found that the crank webs, in spite of accurate finishing, are not parallel in the assembled shaft because the resistance to expansion is different at the inner and outer ends of the bonds. The object of the present invention is to compensate for this difference and thereby make it possible to obtain a crank shaft satisfying all practical demands as to accuracy. The invention is characterized substantially thereby that the members forming parts of the bond, i. e. the crank web, the crank pin and the plug are formed in such a manner or so located in relation to each other that a zone is formed at the outer end of the bond at which the crank pin does not engage one or both of the other members forming the bond.

Figure 1:
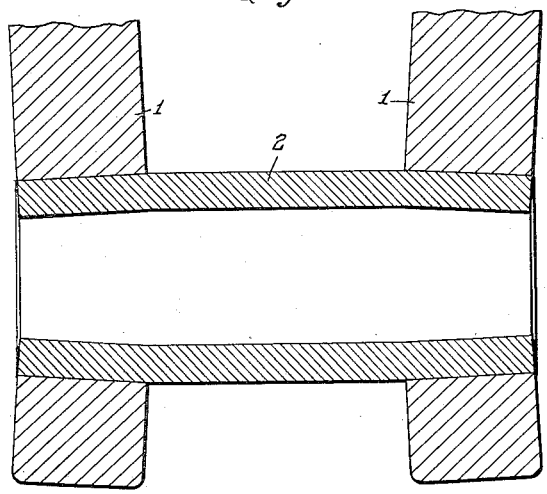
Figure 2:
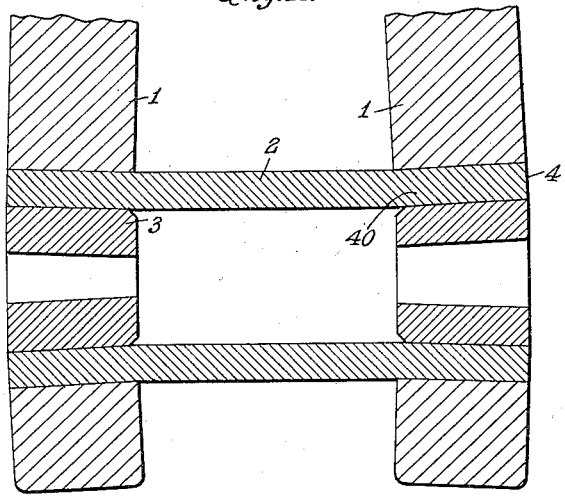

The invention is illustrated in the accompanying drawings in which Figure 1 shows on an exaggerated scale the deformation of the crank pin and of the crank webs after the first assembling operation and Fig. 2 illustrates the deformation of the crank pin and crank webs after the second assembling operation when assembling a crank shaft of the type previously proposed.

Figure 3:
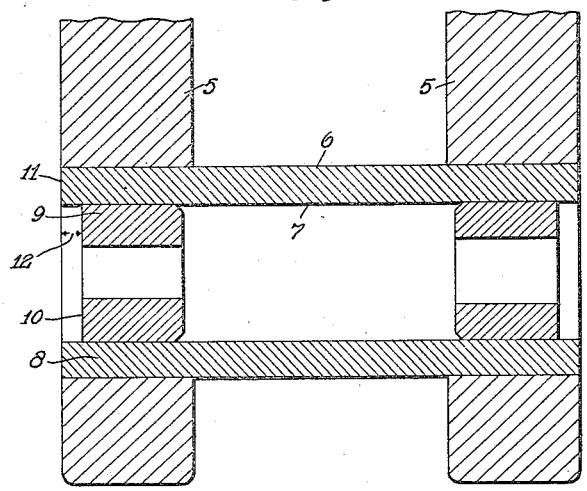
Figure 4:
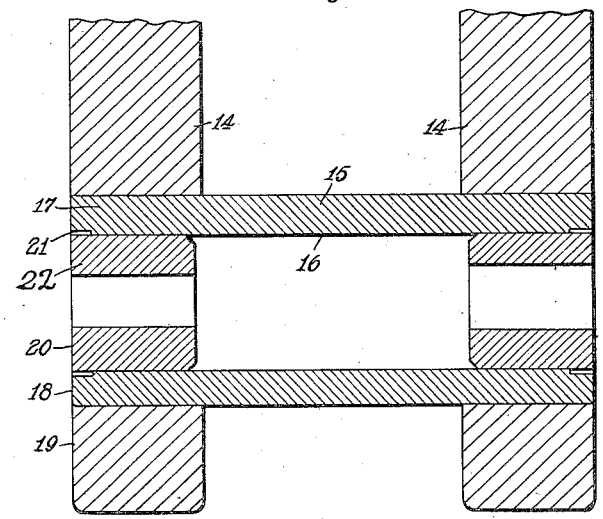

Figs. 3 and 4 show a couple of embodiments of the invention where the free zone at the outer end of the bond has been obtained through the location of the plug inside the end of the bond and through the provision of an annular groove in the inner cylindrical surface of the pin at the end of the pin respectively.

In Fig. 1 the crank webs are designated by the numeral 1 and the crank pin by the numeral 2. The holes in the webs and the inner and outer faces of the crank pin are cylindrical before assembly. The outer diameter of the pin is slightly larger than the diameters of the holes so that the pin has a hard press fit in the holes. When the parts are assembled they are therefore deformed in the manner shown on an exaggerated scale in Figure 1. The part of the pin toward the inner side of the bond is prevented from being compressed to the same extent as the material at the end of the tap by the part of the tap located between the webs. This influences the web in such a manner that the pressure between pin and web is greater at the inside than at the outside of the web. The pin and the hole in the web which were originally cylindrical therefore become more or less tapered as shown in the figure and the web assumes a slightly oblique position in relation to the axis of the pin. The conditions being similar for both the webs the latter will consequently diverge somewhat.

Fig. 2 illustrates how conditions alter when the plugs 3 which are also originally cylindrical are mounted in the pin. The part of the pin situated between the webs still counteracts the deformation in the adjacent zone of the part of the pin entering into the bond. The pin, therefore, expands more at the ends 4 than at the inside of the bond 40 and the web will then be deformed as shown in the figure. In other words, both the webs will approach one another at their further ends reckoned from the bond.

One embodiment of a bond according to the invention is shown in Fig. 3. In this embodiment the plug 9 is made so short that it can be pressed a suitable distance into the hole 7 of the pin 8, whereby the expansion at the outer end of the bond is reduced so that the web 5 will be deformed to substantially the same extent at both sides and therefore assumes a position perpendicular to the axis of the pin 8. It has been found that the distance 12 between the end 10 of the plug 9 and side surface 11 of the web 5 in a web 25 mm. thick can be made about 4–5 mm. This distance can, however, vary according to circumstances and has to be fixed experimentally for each type and size of crank shaft and the hardness of the fit. In the illustration the plug is shown made suitably shorter than the thickness of the web in order not to enlarge the part 6 of the pin which forms the race of the crank bearing.

Another embodiment of the invention is illustrated in Fig. 4. In this embodiment the end face 20 of the plug 22 is flush with the side face 19 of the web 14 and with the end face 18 of the pin 15 as in the case of previous bonds. The cavity 16 in the crank pin 17 is, however, enlarged internally at 21. By this means the outer part of the plug will not exert any pressure against the pin and the same result is consequently obtained as in the case of the form shown in Fig. 3; the webs 14 remaining substantially parallel, and the bearing portion 15 of the pin remains of cylindrical contour.

The invention can, of course, be embodied in other forms. Thus the groove 21 can for instance be made in the plug instead of in the pin as shown in Fig. 4. Grooves may also be made at the outside of the pin or in the hole of the web. According to another embodiment the pin may be slightly shortened so that it does not reach the side face of the web.

Having thus described my invention, I claim and desire to secure by Letters Patent, the following:

1. In a device of the character specified the combination with a web having an opening, of a pin located in the web opening, such pin being formed hollow at the bond, and a plug located in the hollow of the pin, the parts being so formed and located in relation one to the other that a zone is formed at the outer end of the bond in which zone the pin is free of at least one of the other members forming the bond.

2. In a device of the character specified the combination with a web, of a hollow crank pin, and a plug located in the hollow of the pin at the region of the bond, the outer end face of the plug being located inwardly of the side face of the web.

3. In a device of the character specified the combination with a web, of a hollow crank pin, and a plug located in the hollow of the pin at the region of the bond, the length of the plug being less than the thickness of the web, and being located inwardly of the side face of the web.

4. In a device of the character specified the combination with a web, of a hollow crank pin, and a plug located in the hollow of the pin at the region of the bond, there being an annular groove at the outer end of the pin.

5. In a device of the character specified the combination with a web, of a hollow crank pin, and a plug located in the hollow of the pin at the region of the bond, there being an annular groove at the outer end of the pin formed in the inner cylindrical surface of the pin.

6. In a device of the character specified the combination with a web having an opening, of a pin located in the web opening, such pin being formed hollow at the bond, and a plug located in the hollow of the pin, the hollow in the pin being formed larger internally at its outer end, than the plug, whereby it is free of the plug at this region.

7. A bond for a built-up crank shaft comprising a pair of webs each formed with a crank pin opening, a hollow pin in such openings, and plugs located in the hollow of the pin at the region of the bonds, the parts being so formed and located in relation one to the other, that a zone is formed at the outer ends of the bonds in which zone the pin is free of at least one of the other members forming the bond.

8. A bond for a built-up crank shaft comprising a pair of webs each formed with a crank pin opening, a hollow pin in such openings, and plugs located in the hollow of the pin at the region of the bonds, the outer end faces of the plugs being located inwardly of the side faces of the webs.

9. A bond for a built-up crank shaft comprising a pair of webs each formed with a crank pin opening, a hollow pin in such openings, and plugs located in the hollow of the pin at the region of the bonds, the outer ends of the crank pins being enlarged internally whereby the plugs are free of the pin at the outer ends of the bonds.

KARL ERIK KYLÉN.